C. J. IRWIN.
HOB.
APPLICATION FILED MAY 31, 1921.
1,431,402.
Patented Oct. 10, 1922.
3 SHEETS—SHEET 2.
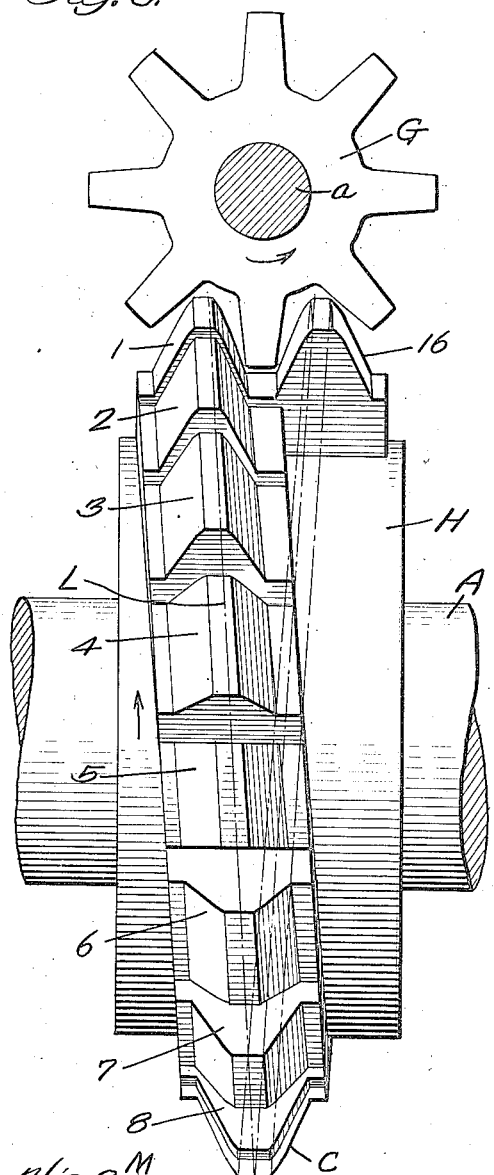
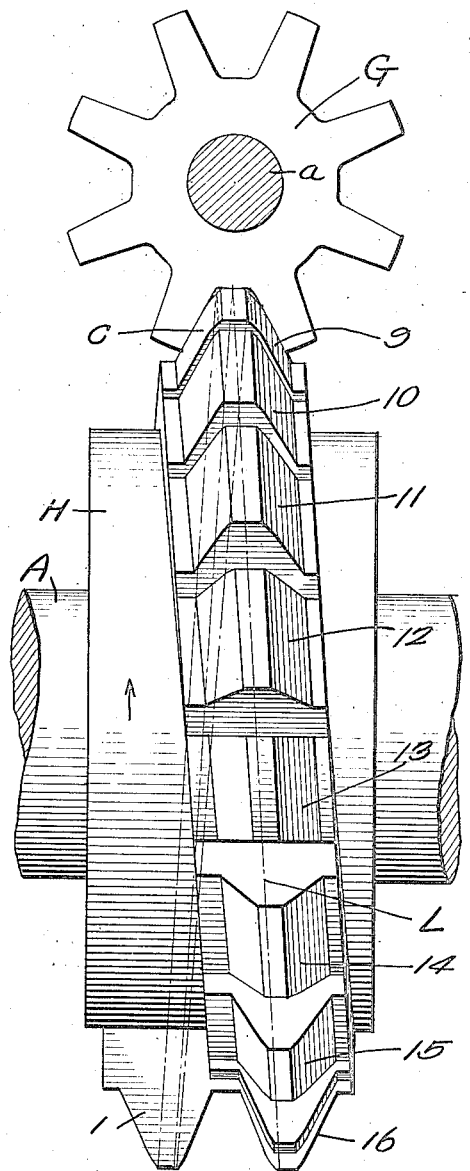
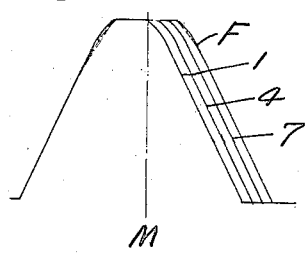
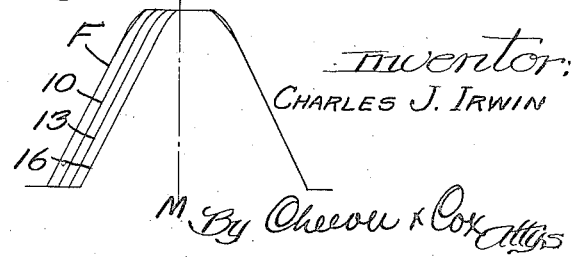
Inventor:
CHARLES J. IRWIN
By Cheever & Cox Attys

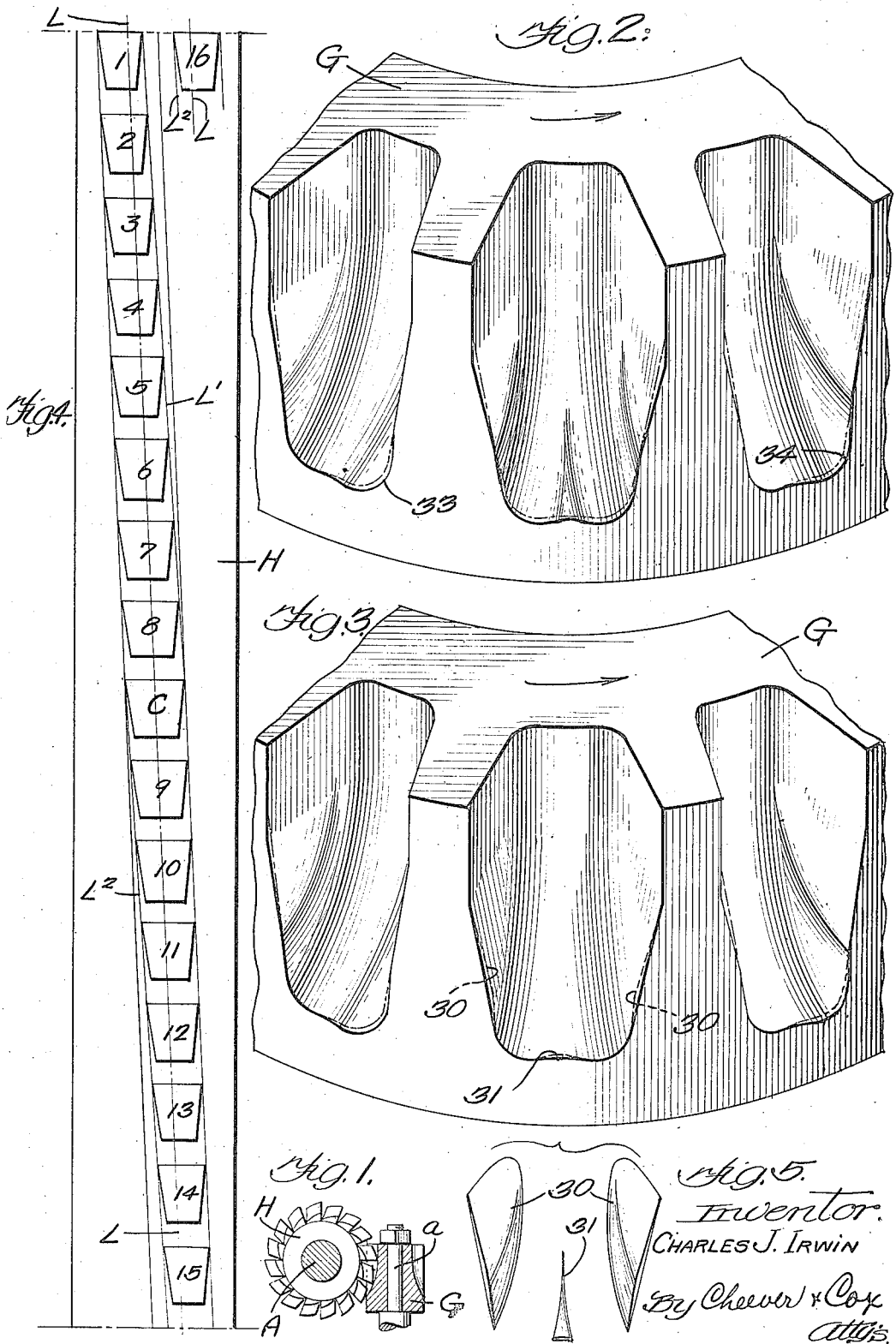

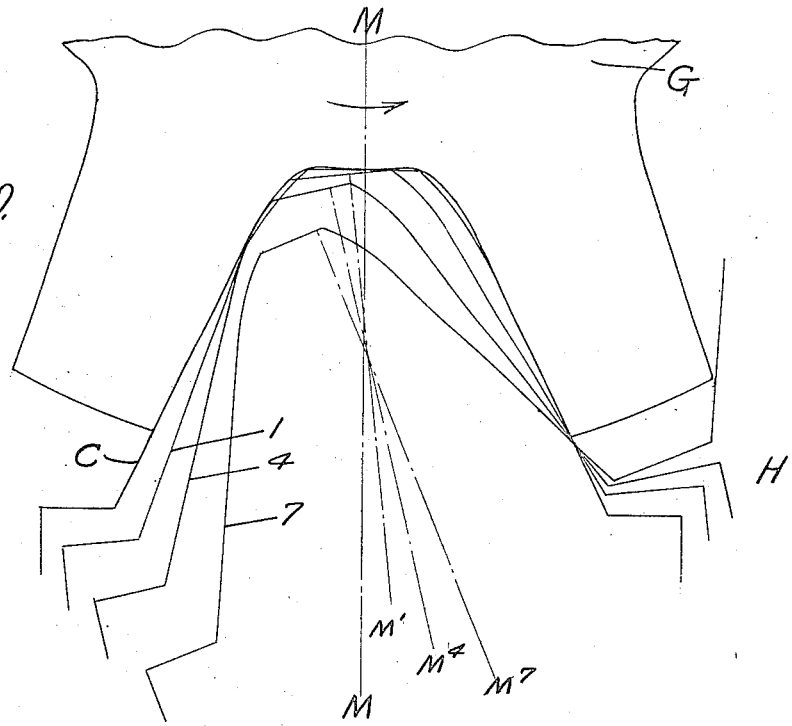
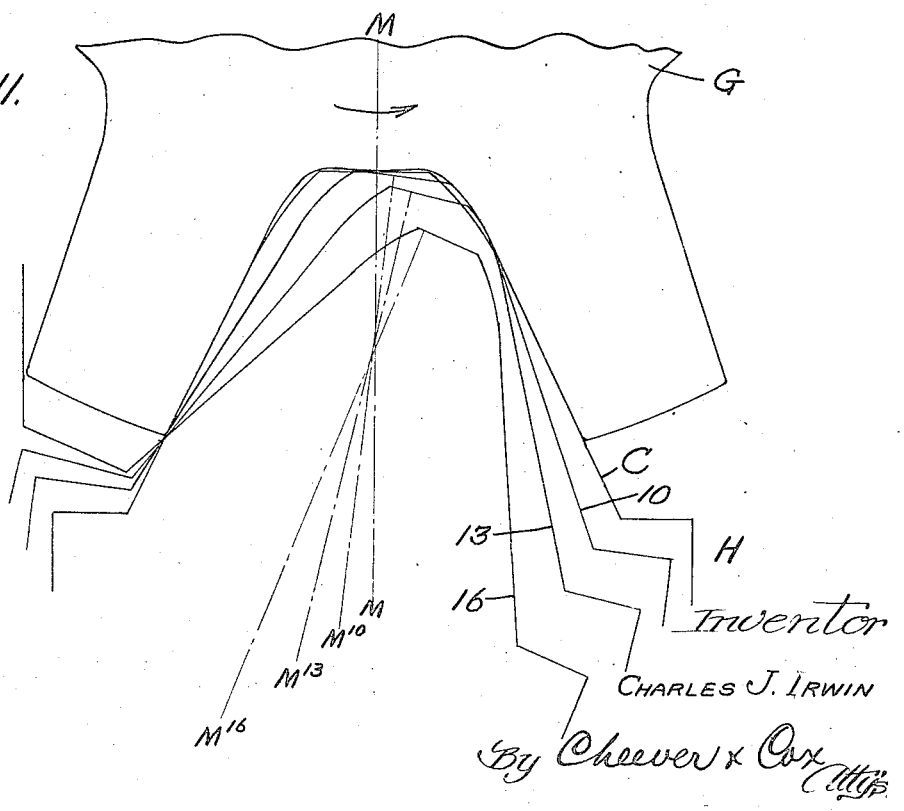

Patented Oct. 10, 1922.

1,431,402

UNITED STATES PATENT OFFICE.

CHARLES J. IRWIN, OF CHICAGO, ILLINOIS, ASSIGNOR TO ILLINOIS TOOL WORKS, OF CHICAGO, ILLINOIS, A CORPORATION OF ILLINOIS.

HOB.

Application filed May 31, 1921. Serial No. 473,669.

*To all whom it may concern:*

Be it known that I, CHARLES J. IRWIN, a citizen of the United States, residing at Chicago, in the county of Cook and State of Illinois, have invented a certain new and useful Improvement in Hobs, of which the following is a specification.

My invention relates to hobs, and the object of the invention is to form a hob in such manner that it may produce teeth of any desired profile, including single or double faced ratchet teeth, and at the same time distribute the work of cutting over a relatively large number of hob teeth, thus relieving any single tooth of an excessive burden, and consequently producing better work and prolonging the life of the hob. It has been proposed, for example, in Zusi Patent No. 1,104,859 to produce gear teeth having radial flanks, but it is accomplished by centering the work opposite to the final or finishing tooth of the hob. I have found that this is objectionable because the hob teeth, especially the finishing tooth, are called upon to remove not only the material which teeth in their position would ordinarily be called upon to remove, but also an additional amount which would, in a common hob, be removed by the teeth which follow or subsequently engage the blank. The additional burden thus thrown upon the teeth of such a hob causes excessive wearing away and reduces the life of the hob per grind. It is evident that to produce accurate work the finishing tooth must be accurate, but where it is called upon to remove an excessive amount of material it soon loses its true shape. The object of my invention is to remedy this drawback. In my hob the tooth which is opposite to the center of the gear blank is also at the center (axially) of the hob and hence, I will term it the "center" tooth.

I accomplish my object in the manner illustrated in the accompanying drawings in which—

Figure 1 is a small assembly view illustrating the usual manner in which a hob is fed relatively to a gear blank or stack of blanks.

Figure 2 is a perspective view of a portion of a gear blank illustrating approximately the appearance of the center space immediately prior to the action of the center tooth.

Figure 3 is similar to Figure 2 but illustrates the blank immediately after the action of the center tooth.

Figure 4 is a diagrammatic view or a development of the periphery of my hob showing its true lead line and also the modified lead lines of the sides of the teeth.

Figure 5 is a perspective view illustrating approximately the shavings taken by the center tooth.

Figure 6 is an assembly view showing some of the preceding teeth in action upon the gear blank.

Figure 7 is similar to Figure 6 but shows the center tooth in action upon the blank.

Figure 8 is a diagrammatic view indicating various "preceding" teeth in their relationship to the median line.

Figure 9 is a diagrammatic view indicating various "succeeding" teeth in their relationship to the median line.

Figure 10 is a diagrammatic view illustrating the action of the teeth preceding the center tooth.

Figure 11 is a diagrammatic view illustrating the action of the teeth following or "succeeding" the center tooth.

Like numerals denote like parts throughout the several views.

I will define the "median line" of a hob tooth as an imaginary line, drawn upon the cutting face or profile surface of a hob tooth and extending radially inward toward the axis of the hob from the true lead line indicated by the line L—L, Figures 4, 6 and 7. In ordinary hob teeth the profile is symmetrical with respect to the median line, that is, the line occurs in the middle of the tooth and the outlines on both sides of it are the same. In the drawings, especially Figures 8 to 11 the median line is indicated by M—M.

In the drawings H represents the hob, G the gear blank, A the hob arbor and $a$ the gear blank arbor. Let it be assumed that the gear blank rotates counter clockwise and that the hob feeds downward—that is, parallel to the gear blank axis and away from the observer, Figures 6 and 7. Let it also be assumed that the lead of the hob is toward the left, and that the hob rotates in such direction that the acting teeth move downward. The terms "right" and "left," "up" and "down" are, of course, used for explanatory purposes only.

In the drawings I have illustrated a case where the teeth are the same on both flanks or faces, and are straight for a considerable distance inward and are not far from radial. Such a gear may be used as a double faced ratchet wheel and as a sprocket wheel for use in a silent chain drive.

In my hob there is a center tooth C which, as best shown in Figure 4, is located at the center of the hob, axially, and in practice comes opposite to the center of the gear blank, as shown in Figure 7. The lower part of this tooth has the same profile as the corresponding portion of the work to be produced. The upper part of the tooth has a curve such as will help generate the lower portion of the work to be produced. The teeth preceding this center tooth and marked Nos. 1 to 8, in Figure 4, and the teeth succeeding said finishing tooth and marked Nos. 9 to 16, are both roughing and finishing teeth. As careful scrutiny of Figure 4 will show, the center tooth is centered with respect to the true lead line L, but the preceding teeth are cut away at the right side and the succeeding teeth are cut away at the right side and the succeeding teeth are cut away at the left side.

The degree to which they are cut away depends upon the formation of the tooth desired, but in any event, it is sufficient to prevent incutting—that is—destroying the correct shape of the tooth. In practice this is effected by making the reduced flanks of the teeth conform to a greater lead. In Figure 4 the line L' indicates the lead on the right side of the preceding teeth 1 to 8, and the line L² indicates the lead on the left side of the succeeding teeth 9 to 16. Thus it may be said that in my hob the advance sides or flanks of the preceding teeth conform to a greater lead or helix angle than the true lead, while the rear sides or flanks conform to a true lead; and that in the subsequent teeth the advance sides or flanks conform to the true lead while the rear flanks conform to a greater lead. This is well illustrated in Figures 10 and 11 where, in each case, the center tooth C is centered opposite to the gear and the median line M occurs halfway between the two flanks. Re-referring to Figure 10, in tooth 1 the advance flank is closer to its median line $M^1$, in tooth 4 the advance flank is still closer to its median line $M^4$, and in tooth 7 the advance flank is still closer to its median line $M^7$. In the same way, referring to Figure 11, the median line M of center tooth C occurs halfway between the two flanks. In tooth 10 the rear flank is closer to its median line $M^{10}$, in tooth 13 the rear flank is still closer to its median line $M^{13}$, and so on. As a result, the advance flanks of the preceding teeth avoid incutting the flank of the advance tooth of the gear blank and the rear flanks of the succeeding or following hob teeth avoid incutting the flank of the following tooth of the gear blank. The principle is illustrated in still another form in Figures 8 and 9 where the same reference characters are employed.

The left side of the preceding teeth and the right side of the teeth following the center tooth finish (by generating) the lower portion of the work to be produced. This finishing is done in the same manner as in an ordinary hob. The generated portion of the work is a continuation of the portion finished by the center tooth. The extra lead on the reduced sides of the hob teeth is such as to allow the said teeth to cut very close to the desired profile, leaving just sufficient stock for the center tooth to remove. For the purpose of illustration only I have shown in Figure 5 the shavings 30 and 31 removed by the tooth. The position occupied by these shavings prior to their removal is indicated at the points 30 and 31 in Figure 3. At point 33 is shown in dotted lines the location of the last preceding tooth and at 34 the first succeeding tooth. These indications, however, are to be taken as suggestive rather than specific.

The advantage of my hob is that it has teeth both preceding and succeeding the center tooth which are utilized for roughing and generating. Thus the work is distributed over substantially twice as many teeth as in the case of a hob adapted to be set with its final tooth opposite to the center of the gear blank. In case it is desired to produce teeth having both flanks radial, the center tooth completely finishes the profile, but in other cases, such as the one illustrated where the flanks of the teeth are straight throughout the greater portion of the height of the tooth and the flanks are not radial, the center tooth finishes the upper portion of the tooth and helps to generate the bottom of the space, while the other teeth act as roughing teeth and the upper portion serve also to finish the lower or inner portions of the flanks of the gear teeth. The center tooth engages on both sides simultaneously and hence finishes a greater amount of surface than any other single tooth. Outside of the pitch line of the gear, the center tooth (in the configuration illustrated) constitutes a "formed" finishing tooth, but inside of the pitch line of the gear it constitutes chiefly a generating tooth, although it normally also takes a shaving 31 from the bottom of the tooth space of the blank. As the work is thus distributed over substantially twice as many teeth, the amount of work per tooth is reduced substantially by half and the number of pieces which the hob will produce per grind is greatly increased.

In employing the term "formed" tooth I mean to imply a tooth simultaneously finishing a considerable portion of two adjacent gear teeth. As previously indicated, in the case of double faced radial teeth the center tooth is entirely a formed tooth as it finishes the entire space between the adjacent teeth. In other cases the amount finished is less and recedes from the bottom of the tooth space as the flanks of the hob teeth become more divergent.

Having thus described my invention, what I claim as new and desire to secure by Letters Patent is:

1. A hob having a formed tooth adapted to come opposite to the center of the blank, and succeeding teeth the rear sides whereof are cut away to prevent incutting of the blank.

2. A hob having a formed center tooth, and teeth preceding and succeeding it, the preceding teeth having an extra lead on one side and the succeeding teeth having an extra lead on the opposite side.

3. A hob having a center tooth which in practice comes opposite to the center of the gear and is "formed" in the sense of being adapted to simultaneously engage the flanks of two adjacent teeth, the formed portion extending inward substantially to the pitch line of the blank, the hob also having teeth preceding and succceeding the center tooth and adapted to generate the flanks of the teeth inside of the pitch circle of the blank, the advance sides of the preceding teeth and the rear sides of the succeeding teeth being cut away to prevent incutting of the blank.

4. A hob having a center tooth adapted to come opposite to the center of the blank, the center tooth being adapted to produce flat finished surfaces simultaneously on two adjacent teeth, the center tooth also being adapted to shave the bottom of the space between the teeth, the hob also having preceding teeth and succeeding teeth and adapted to generate a continuation of the flat surfaces formed by the center tooth.

5. A semi-generating hob having a formed center tooth and generating teeth on either side thereof, axially considered.

In witness whereof, I have hereunto subscribed my name.

CHARLES J. IRWIN.